(12) United States Patent
Suzuki

(10) Patent No.: US 6,401,705 B1
(45) Date of Patent: Jun. 11, 2002

(54) DIAMOND BLADE AND METHOD OF MANUFACTURING THE SAME

(75) Inventor: Koichi Suzuki, Atsugi (JP)

(73) Assignee: Sankyo Diamond Industrial Co., Ltd. (JP)

( * ) Notice: Subject to any disclaimer, the term of this patent is extended or adjusted under 35 U.S.C. 154(b) by 0 days.

(21) Appl. No.: 09/600,015

(22) PCT Filed: Sep. 24, 1999

(86) PCT No.: PCT/JP99/05229

§ 371 (c)(1),
(2), (4) Date: Jul. 11, 2000

(87) PCT Pub. No.: WO00/30810

PCT Pub. Date: Jun. 2, 2000

(30) Foreign Application Priority Data

Nov. 20, 1998 (JP) .......................................... 10-346648
Nov. 20, 1998 (JP) .......................................... 10-346649

(51) Int. Cl.$^7$ ................................................ B28D 1/04
(52) U.S. Cl. ........................................ 125/15; 451/547
(58) Field of Search ............................. 125/15, 13.01, 125/18; 451/540, 541, 542, 543, 547, 548

(56) References Cited

U.S. PATENT DOCUMENTS

| 4,624,237 A | * 11/1986 | Inoue ........................... 125/15 |
| 4,982,720 A | * 1/1991 | Matsuda ....................... 125/15 |
| 5,040,341 A | * 8/1991 | Okinaga .................... 51/206 R |
| 5,537,987 A | * 7/1996 | Okawauchi ................... 125/15 |
| 5,697,359 A | * 12/1997 | Okanishi et al. ............... 125/15 |

FOREIGN PATENT DOCUMENTS

| JP | 67653/1983 | 5/1983 |
| JP | 4-101781 | 4/1992 |
| JP | 7-60650 | 3/1995 |
| JP | 8-904425 | 4/1996 |
| JP | 10-180639 | 7/1998 |

\* cited by examiner

Primary Examiner—Timothy V. Eley
Assistant Examiner—Dung Van Nguyen
(74) Attorney, Agent, or Firm—Lorusso & Loud

(57) ABSTRACT

A diamond blade S includes a blade portion 2a formed of diamond abrasive grains and fixed to a base plate 1 along the outer circumferential edge thereof. Isolated cutting elements 2b are provided on at least a front or reverse face of the base plate 1 such that the isolated cutting elements 2b are separated from the blade portion 2a fixed along the outer circumferential edge.

11 Claims, 19 Drawing Sheets

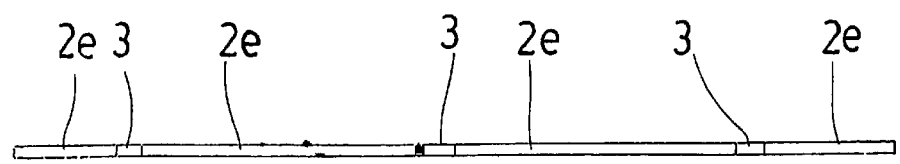
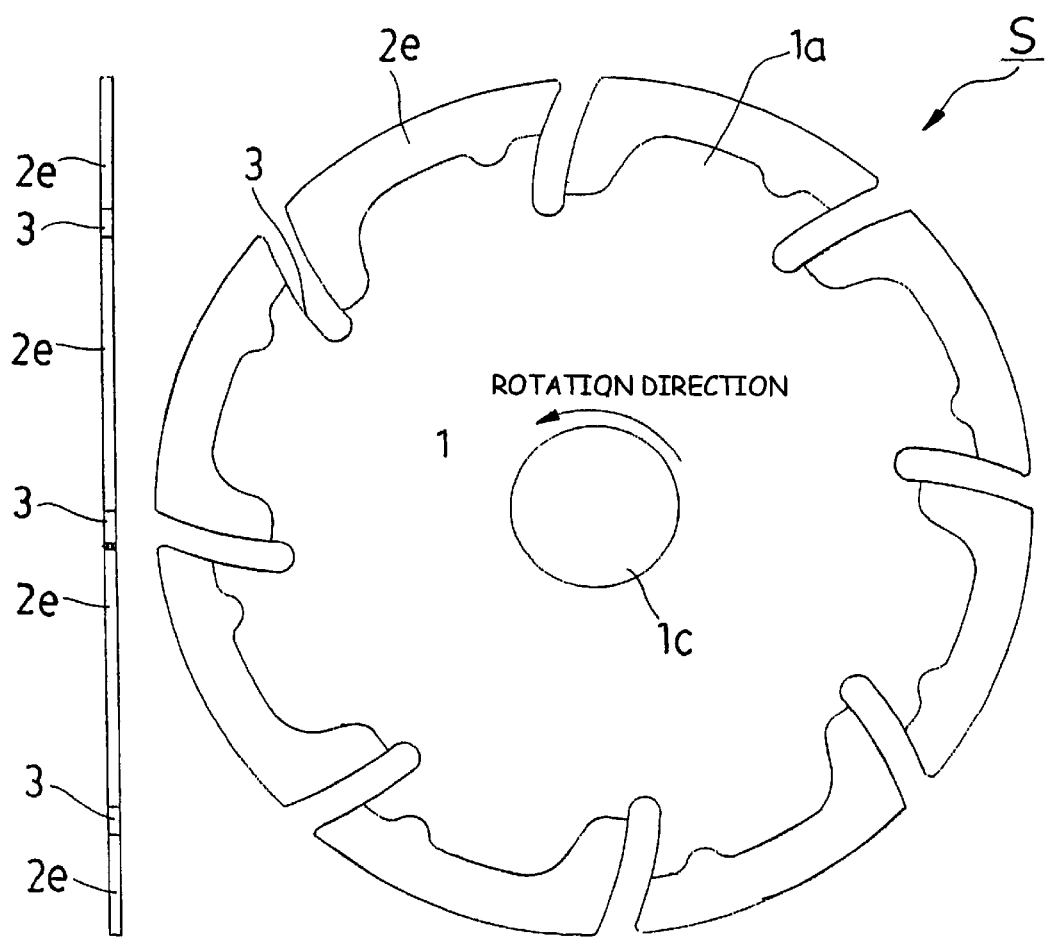
Fig. 13(b)
Fig. 13(c)   Fig. 13(a)

Fig. 17
| | (UNIT:mm) | |
|---|---|---|
| | MORTAR AND GRINDING WHEEL WERE CUT | |
| | ΔT | Δt |
| DIAMOND BLADE ROTATION DIRECTION 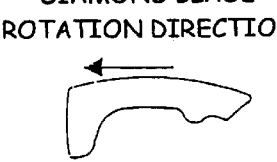 | 0.36 | 0.13 |
| DIAMOND BLADE ROTATION DIRECTION  | 0.34 | 0.21 |
ΔT : THICKNESSWISE WEAR OF DIAMOND SEGMENTS
Δt : THICKNESSWISE WEAR OF STEEL BASE PLATE

DIAMOND BLADE AND METHOD OF MANUFACTURING THE SAME

TECHNICAL FIELD

The present invention relates to a diamond blade for cutting and to a method of manufacturing the same, and more particularly to a diamond blade used for cutting stone, concrete, or any other workpiece, as well as to a method of manufacturing the same.

BACKGROUND ART

A blade used for cutting a hard material such as stone or concrete consists of a circular base plate, and a layer of super abrasive grains, such as diamond abrasive grains or CBN abrasive grains, which is bonded to the outer circumferential edge of the base plate through direct sintering, brazing, welding.

Alternatively, the blade consists of a circular base plate, and diamond segments which are fixed to the outer circumferential edge of the base plate at predetermined intervals.

When a workpiece; for example, a concrete member, is cut by use of such a diamond blade, a boundary portion (hereinafter referred to as a "neck") between the diamond-abrasive-grain layer (or the diamond segment) and the base plate thinner than the diamond-abrasive-grain layer (or the diamond segment) wears considerably due to swarf which is generated during cutting and which has a strong wearing effect, with the result that the diamond-abrasive-grain layer (or the diamond segment) may drop from the base plate due to the neck wear, even if the diamond grain layer (or the diamond segment) is still usable.

In order to prevent the above-described neck wear, diamond blades as shown in FIGS. 18 and 19 have been proposed. In the diamond blade 60 shown in FIG. 18, two types of diamond segments are provided on the outer circumferential surface of a steel base plate 61. Specifically, there are provided a plurality of ordinary diamond segments 62 having an arcuate shape, and a plurality of irregular-shaped diamond segments 64 whose side surfaces extend to the vicinity of the lower end of a slot 63 formed at the outer circumference of the steel base plate 61 on the front side with respect to the rotation direction. The ratio in number between the tips 62 and 64 is set in the range of about 3:1 to 6:1 (West German Patent Application Laid-Open No. 3005324 discloses a diamond blade similar to that shown in FIG. 18).

In the diamond blade 70 shown in FIG. 19, a mixture of metal powder, and diamond or CBN abrasive grains is bonded to a steel base plate 71 through sintering. Specifically, there are provided super-abrasive-grain layers 72 and tips (each having a leg portion) 72A having a super-abrasive-grain layer which extends toward the inner circumference of the base plate in order to achieve prevention of neck wear and other effects. Therefore, the diamond blade 70 can prevent neck wear. Further, when the diamond blade 70 cuts a hard plate material or the like, the diamond blade 70 can made the cut surface smoother than can conventional diamond blades, because the leg portion of the tip extends from the center of the super-abrasive-grain layer toward the center of the base plate to thereby form a T-like shape.

The diamond blade 60 shown in FIG. 18 is effective in terms of prevention of neck wear; however, since opposite sides of the irregularly-shaped tip 64 have a large total area, cutting resistance is high, resulting in a deterioration in cutting performance. The diamond blade 70 shown in FIG. 19 has the following problem. When the diamond blade 70 cuts a workpiece, the workpiece or swarf strike the leg portions of the base plate. Further, since the leg portions hinder discharge of the swarf, the swarf stagnates between cut surfaces and the base plate. Thus, so-called neck wear is accelerated. Further, when swarf stagnates, rotational friction is generated between the cut surfaces and the base plate, so that smooth rotation of the diamond blade is hindered. Consequently, deflection occurs during rotation, resulting in deteriorated straightness of the travel path.

The present invention was accomplished to solve the above-described problems, and an object of the present invention is to provide a diamond blade which can prevent neck wear and deterioration in cutting performance simultaneously, which is inexpensive, and whose travel path has excellent straightness, as well as a method of manufacturing the diamond blade.

DISCLOSURE OF THE INVENTION

The present invention provides a diamond blade in which a blade portion formed of diamond abrasive grains is fixed to a base plate along the outer circumferential edge thereof, characterized in that isolated cutting elements are provided on at least a front or reverse face of the base plate such that the isolated cutting elements are separated from the blade portion fixed along the outer circumferential edge.

Since isolated cutting elements are provided on the base plate, a workpiece is cut by both the isolated cutting elements and the blade portion provided along the outer circumferential edge of the base plate, and the flow of swarf is divided into a plurality of flows, so that swarf does not concentrate at the neck, and thus neck wear can be prevented. Further, since the isolated cutting elements grind cut surfaces, the resistance generated at the side surfaces during cutting can be reduced, and the finish of cut surfaces is improved.

Preferably, the blade portion formed of diamond abrasive grains is fixed to the outer circumferential edge of the base plate by means of direct sintering, and recesses are formed alternately on the front and reverse faces of the base plate such that each recess extends from the outer circumferential edge of the base plate while inclining forward with respect to the rotation direction of the base plate. Therefore, swarf generated during cutting of a workpiece is discharged from the recesses effectively as the diamond blade rotates, whereby generation of rotational friction, which would otherwise be generated due to stagnation of swarf between cut surfaces and the base plate, can be prevented.

When, as described above, the blade portion formed of diamond abrasive grains is fixed to the outer circumferential edge of the base plate by means of direct sintering, the isolated cutting elements are preferably fixed to predetermined positions of the base plate by means of direct sintering. When formation of the blade portion of diamond abrasive grains, formation of the isolated cutting elements, and connection of these blade portions to the base plate are performed by means of direct sintering, the diamond blade can be manufactured at low cost.

Preferably, each of the isolated cutting elements has a substantially trapezoidal shape which inclines forward from the outer end thereof with respect to the rotation direction of the base plate, because this configuration maintains smooth rotation of the diamond blade. Further, the isolated cutting elements are preferably formed on a line extending from the corresponding recess.

Preferably, each section of the blade portion formed of diamond abrasive grains and located between the recesses has an extended blade portion formed on the front or reverse face of the base plate, the extended blade portion extending toward the center of the base plate and adjacent extended blade portions being spaced at predetermined intervals. Alternatively, adjacent sections of the blade portion formed of diamond abrasive grains and sandwiching the corresponding recess on the front or reverse face of the base plate are extended toward the center of the base plate, and inner ends of the extended sections are connected together to form a substantially squarish C-like. shape to thereby form at least one irregular-shaped blade portion.

When, as described above, the blade portion has an extended blade portion or irregular-shaped blade portion, a workpiece is cut by blade portions having different shapes, and the flow of swarf is divided into a plurality of flows, so that swarf does not concentrate at the neck, and thus neck wear can be prevented. Further, since the blade portions extending toward the center side grind cut surfaces, the finish of cut surfaces is improved.

Preferably, the isolated cutting elements, the extended blade portions, or the irregular-shaped blade portions are formed on both the front and the reverse faces of the base plate. In this case, the effects of preventing neck wear and improving the finish of cut surfaces can be attained on both the front and reverse faces of the base plate.

At this time, the isolated cutting elements, the extended blade portions, or the irregular-shaped blade portions are preferably formed on the front and reverse faces of the base plate with a phase difference of a predetermined angle as measured with the rotational center of the base plate serving as a vertex. In this case, the thickness of the diamond blade can be maintained constant, and therefore, the diamond blade can be rotated smoothly. In addition, since the flow of swarf is divided into a plurality of flows, swarf neither concentrates nor stagnates at one location.

Preferably, crest portions and trough (recess) portions are alternately formed on opposite faces of the base plate, so that the base plate has a wavy surface on either face. In this case, swarf can be discharged smoothly from the trough (recess) portions, and upon rotation of the blade, an air-cooling effect occurs, so that accumulation of heat at the cutting edge and the base plate can be avoided.

The present invention further provides a diamond blade in which slots are formed in a base plate at predetermined intervals, and a diamond segment is fixed to the outer circumferential surface of the base plate to be located between the corresponding slots, characterized in that each of the slots extends from the outer circumferential edge toward the center of the base plate, while inclining forward with respect to the rotation direction of the base plate; and the diamond segment has an elongated portion extending along the outer circumferential surface of the base plate and an extension portion extending from the elongated portion along the slot located on the front side of the elongated portion with respect to the rotation direction, the elongated portion and the extension portion forming an L-like shape.

As described above, the diamond blade of the present invention has a structure such that a diamond segment is fixed to the base plate having slots, and the diamond segment has an extension portion extending from the elongated portion along the slot located on the front side of the elongated portion with respect to the rotation direction to thereby form an L-like shape. Therefore, as the amount of intrusion of the diamond blade into a workpiece increases, the extension portion extending along the slot comes into contact with the workpiece, whereby cutting work proceeds.

Accordingly, the workpiece is cut and ground by means of the extension portion, and swarf is discharged from the slots. In this manner, swarf is prevented from entering the spaces between the base plate and the diamond segments, and thus neck wear is prevented. In addition, it is possible to prevent generation of rotational friction which would otherwise be generated due to stagnation of swarf between the base plate and the diamond segments.

Preferably, the extension portion extends up to a point in the vicinity of the bottom of the corresponding slot. In this case, the extension portion comes into contact with a cut surface of a workpiece over a wider range, so that the workpiece can be cut more efficiently. Preferably, the diamond segment has a projection extending toward the center of the base plate in the vicinity of the rear end with respect to the rotation direction. This structure enables the diamond segment to be reliably fixed to the base plate.

Even in the case of the diamond blade in which a diamond segment is fixed the base plate having slots, isolated cutting elements are preferably formed on at least the front or the reverse face of the base plate. In this case, the flow of swarf is divided into a plurality of flows, so that neck wear can be prevented more effectively.

In a method of manufacturing a diamond blade according to the present invention, the diamond blade is manufactured through so-called direct sintering in which sintering of the diamond segment and bonding of the diamond segment to the base plate are performed in the same step. Therefore, production cost can be reduced greatly.

BRIEF DESCRIPTION OF THE DRAWINGS

FIG. 13(a) is a front view of the diamond blade according to the fourth embodiment of the present invention;

FIG. 13(b) is a top view of the diamond blade shown in FIG. 13(a);

FIG. 13(c) is a side view of the diamond blade shown in FIG. 13(a);

FIG. 17 is a table showing the results of an experiment performed in relation to the fourth embodiment.

BEST MODE FOR CARRYING OUT THE INVENTION

Figure 1:
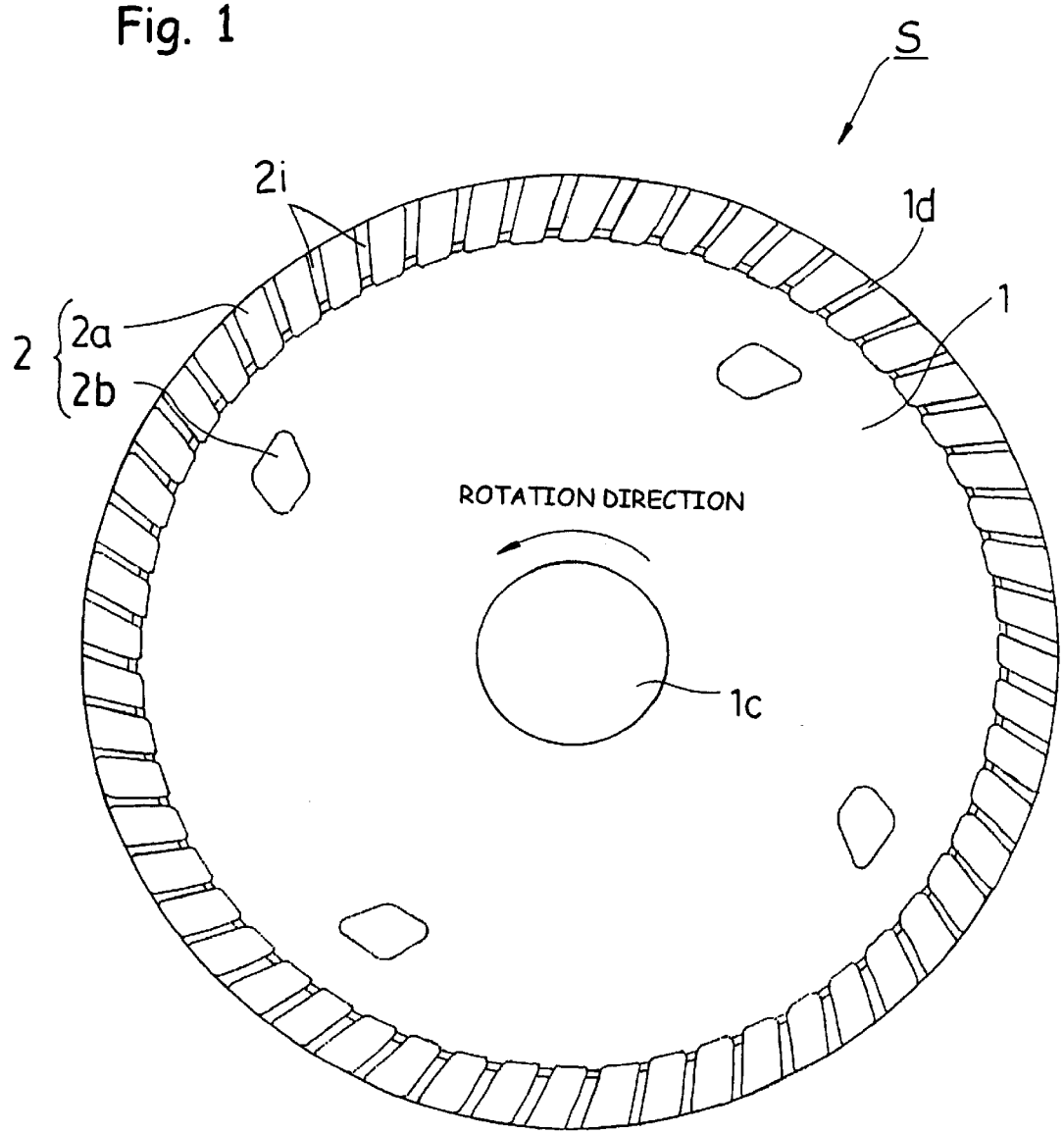
FIGS. 1 to 3 are front views each showing a diamond blade according to a first embodiment of the present invention.

Embodiments of the present invention will now described with reference to the drawings. However, members, arrangements, etc. mentioned in the following description do not limit the scope of the invention, and may be changed in various ways within the scope of the present invention.

(First Embodiment)

A diamond blade S according to the present embodiment comprises a steel base plate 1 and blade portions 2 formed of diamond abrasive grains. In the diamond blade S according to the present embodiment, the blade portions 2 include a first blade portion 2a disposed along the outer circumferential edge of the steel base plate 1 and second blade portions 2b or isolated cutting elements separated from the first blade portion 2a.

The steel base plate 1 is formed of carbon tool steel and has a circular shape, and an attachment hole 1c for attachment to an unillustrated jig is formed at the center of the steel base plate 1. The steel base plate 1 is preferably manufactured from a special plate; e.g., a three-layer plate well known in the art. In this case, cutting noise generated upon cutting stone or concrete material can be lowered without any change in cutting performance.

Figure 2:
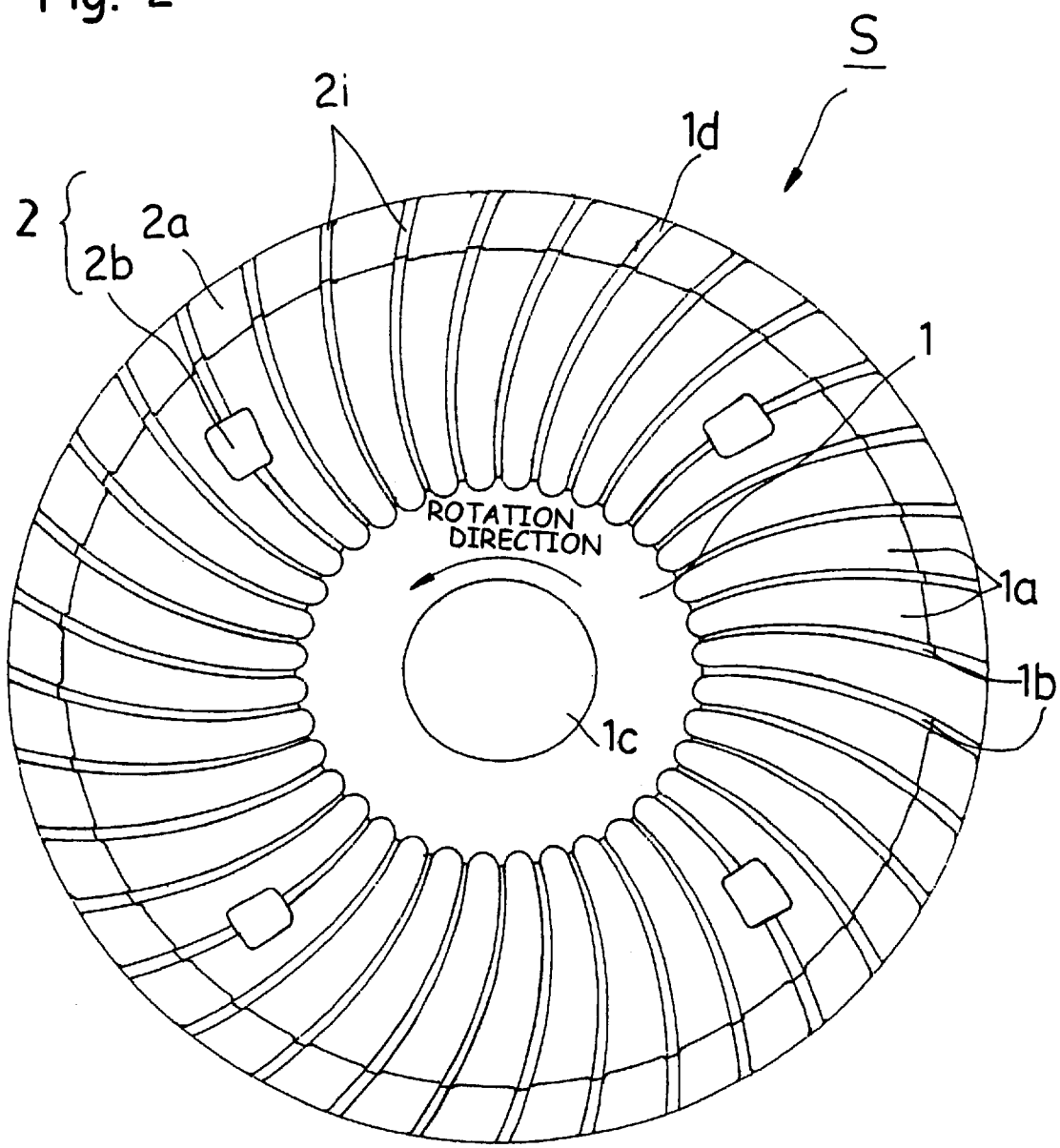

A steel base plate which has crest portions having an arcuate cross section and flat trough (recess) portions on the surface as shown in FIG. 2 may be used as the steel base plate 1. When the steel base plate 1 having a wavy surface is used, upon rotation of the blade, an air-cooling effect occurs, so that accumulation of heat at the cutting edge can be reduced effectively.

As shown in FIGS. 1 and 2, diamond-layer recesses 2i are formed on the outer circumferential edge of the steel base plate 1. The recesses 2i each have a predetermined width (5 mm in the present embodiment). The first blade portion 2a is disposed on both sides of the recesses 2. Further, the second blade portions 2b separated from the first blade portion 2a and serving as isolated cutting elements, are disposed at predetermined positions of the steel base plate 1.

The first blade portion 2a and the second blade portions 2b are preferably attached to the steel base plate 1 by a so-called direct sintering method in which formation of diamond-abrasive-grain layers is performed simultaneously with bonding of the diamond-abrasive-grain layers to the steel base plate 1.

The first blade portion 2a disposed along the outer circumferential edge of the steel base plate 1 has recesses 2i which are formed alternately on the front and reverse faces of the steel base plate 1. The recesses 2i facilitate intrusion of the diamond blade S into a workpiece during cutting operation, and serve as discharge recesses for discharging swarf and other substances. The recesses 2i incline forward from the outer end thereof with respect to the rotation direction of the steel base plate 1, whereby a substantially parallelogram-shaped blade portion having an outer side longer than the inner side is formed on either side of each of the recesses 2i. The first blade portion 2a has a thickness slightly greater than that of the steel base plate 1.

Figure 3:
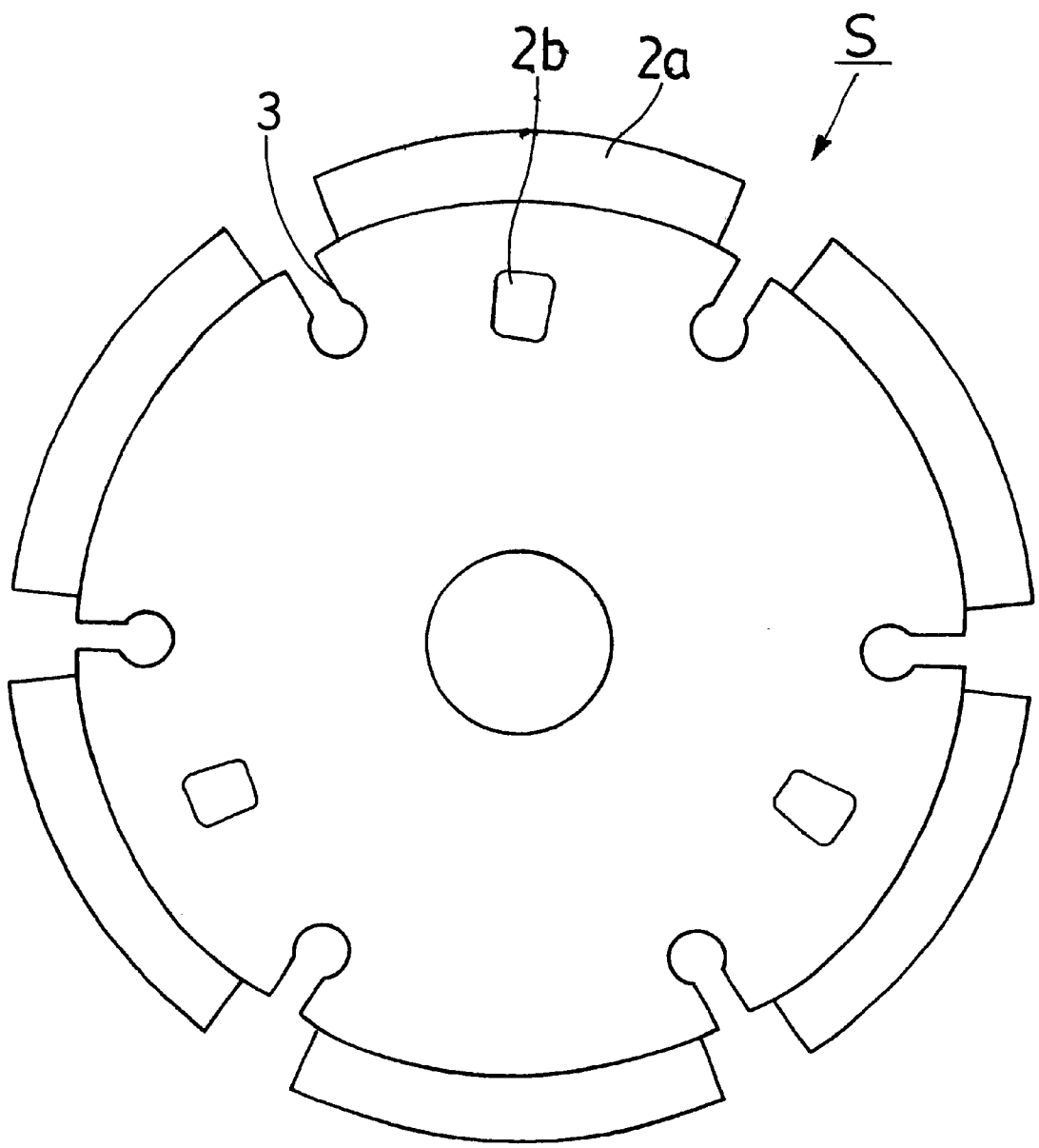

The shape of the first blade portion 2a formed along the outer circumferential edge of the steel base plate 1 is not limited to the above-described shape. For example, the recesses 2i may be omitted. Further, a structure as shown in FIG. 3 may be employed. That is, a plurality of slots 3 are formed in the outer circumferential portion of the steel base plate 1 at constant intervals; and a diamond tip is attached between two adjacent slots 3 as the first blade portion 2a.

The second blade portions 2b are formed on either the front or reverse face of the steel base plate 1 or on both the front and reverse faces of the steel base plate 1. For example, as shown in FIG. 1, each of the second blade portions 2b has a substantially trapezoidal shape which inclines forward from the outer end thereof with respect to the rotation direction of the base plate, and is formed on a line extending from the corresponding recess 2i of the first blade portion 2a.

The second blade portions 2b are not limited to the above-described shape and may assume any other shape such as a circular shape, a triangular shape, or a polygonal shape.

The number of and interval between the second blade portions 2b are properly determined in accordance with the size of the diamond blade S, or the size of the isolated cutting elements 2b themselves. A plurality of rows of the isolated cutting elements 2b may be disposed from the center toward the outer cicumferential edge of the steel base plate 1. Alternatively, each of the blade portions 2b may be disposed at a different radial position. Further, the isolated cutting elements 2b may be disposed only on the front or reverse face of the steel base plate 1.

When the second blade portions 2b are formed on both the front and reverse faces of the base plate, the second blade portions 2b are formed on the front and reverse faces of the base plate with a phase difference of a predetermined angle as measured with the rotational center of the steel base plate 1 serving as a vertex.

Next, cutting work by use of the diamond blade S according to the first embodiment will be described. First, the first blade portion 2a comes in contact with a workpiece (not shown) and starts cutting. As the amount of intrusion of the diamond blade S into the workpiece increases, the second blade portions 2b located closer to the center of the steel base plate 1 come in contact with the workpiece. The cutting work proceeds in this manner.

As described above, the workpiece is cut by the first blade portion 2a and the second blade portions 2b having different shapes, and the flow of swarf is divided into a plurality of flows, due to the presence of gaps between the first blade portion 2a and the second blade portions 2b. Accordingly, swarf does not concentrate at the neck, so that neck wear is prevented.

Moreover, since the second blade portions 2b grind the cut surfaces, the finish of the cut surfaces can be improved.

In addition, when the diamond blade S of the present invention is used, the workpiece is cut while the cut surfaces of the workpiece are ground by the second blade portions 2b. Therefore, there can be prevented generation of friction of steel center, which would otherwise occur due to contact between the cut surface and the base plate, so that lateral deflection of the diamond blade S during cutting operation can be prevented. Thus, straight cutting is enabled. Further, since the size of a clearance provided for suppressing friction of steel center can be reduced, the diamond blade S can be made thinner than can conventional diamond blades.

(Second Embodiment)

A diamond blade S according to the present embodiment is manufactured by a so-called direct sintering method in which formation of diamond-abrasive-grain layers is performed simultaneously with bonding of the diamond-abrasive-grain layers to the steel plate. The diamond blade S comprises blade portions 2. In the diamond blade S according to the present embodiment, the blade portions 2 include a first blade portion 2a disposed along the outer circumferential edge of the steel base plate 1, second blade portions 2b serving as isolated cutting elements separated from the first blade portion 2a, and third blade portions 2c serving as extended blade portions which extend toward the center of the steel base plate 1.

When the diamond blade S is of 4-inch size, the diamond blade S has an outer diameter of 107 mm, a blade thickness of 2.2 mm, and a blade width of 8 mm, and the steel base plate 1 has an outer diameter of 91 mm. These design values are changed in accordance with the size of the diamond blade S. In the following description, the diamond blade S is assumed to be of 4-inch size.

The steel base plate 1 is formed of carbon tool steel and has a circular shape, and an attachment hole 1c for attachment to an unillustrated jig is formed at the center of the steel base plate 1. On either face of the steel base plate 1 are formed crest portions 1a having an arcuate cross section and flat trough (recess) portions 1b which form a wavy surface. The height of the crest portions is increased gradually toward the outer circumference, and the width of the crest portions is decreased gradually toward the center of the steel base plate 1.

Further, the crest portions 1a and the trough (recess) portions 1b are curved to form a whirlpool-like shape such that they extend radially toward the direction opposite the rotation direction of the diamond blade S. The crest portions 1a and the trough (recess) portions 1b are formed on both faces of the steel base plate 1 such that their angular positions on the reverse face are shifted from those on the front face.

The steel base plate 1 is preferably manufactured from a special plate; e.g., a three-layer plate well known in the art. In this case, cutting noise generated upon cutting stone or concrete material can be lowered without any change in cutting performance.

Alternatively, a circular flat plate having neither the crest portions 1a nor the trough (recess) portions 1b may be used as the steel base plate 1.

Diamond-layer recesses 2i are formed on the outer circumferential edge of the steel base plate 1. The diamond-layer recesses 2i each have a predetermined width (5 mm in the present embodiment). The first blade portion 2a is disposed on both sides of each diamond-layer recesses 2i.

Figure 5:
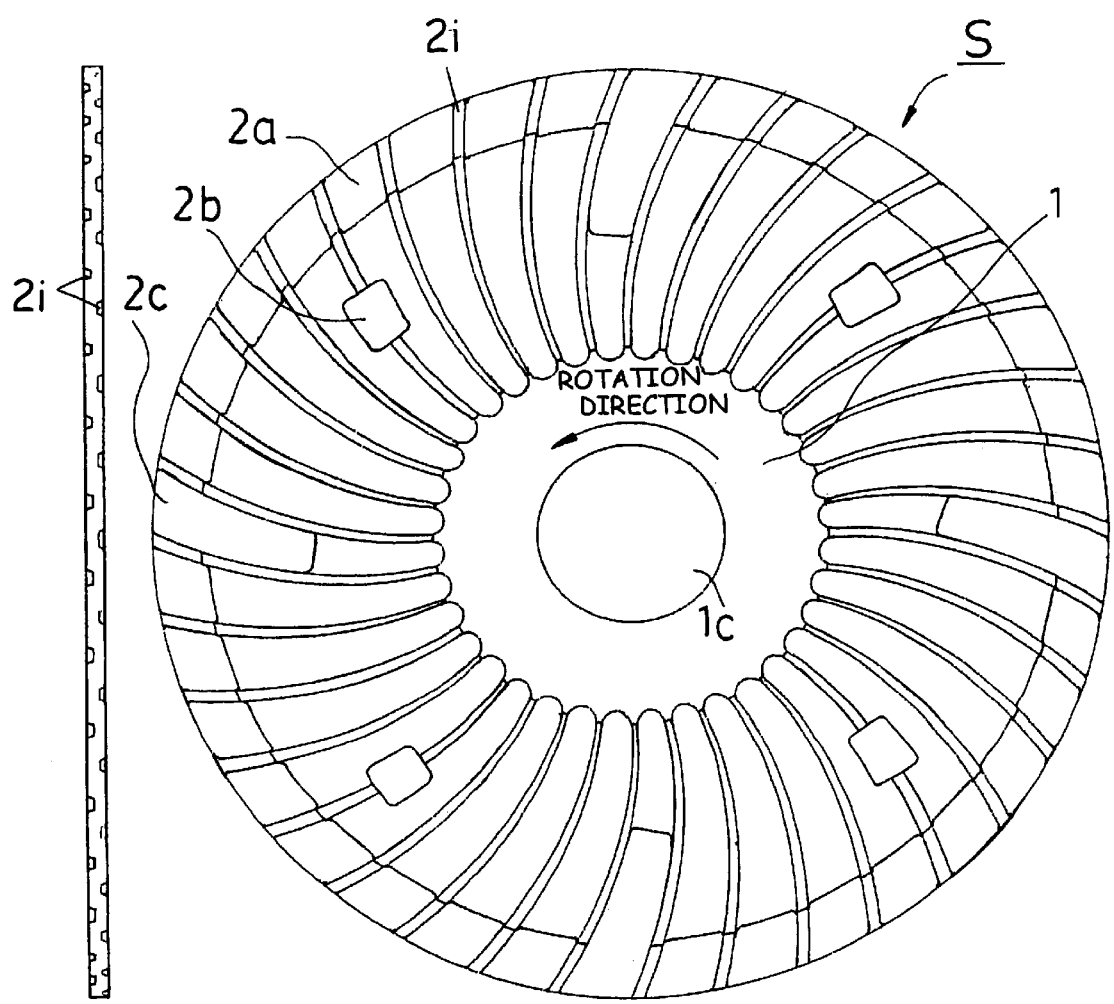
FIG. 5(a) is a front view of the diamond blade according to the second embodiment of the present invention.
FIG. 5(b) is a top view of the diamond blade shown in FIG. 5(a)
FIG. 5(c) is a side view of the diamond blade shown in FIG. 5(a)

As shown in FIGS. 5(b) and 5(c), the first blade portion 2a has recesses 2i which are alternately formed on the front and reverse faces of the steel base plate 1 such that the recesses 2i correspond to the ends of the crest portions 1a and such that the recesses 2i are continuous with the trough (recess) portions 1b of the steel base plate 1. The recesses 2i facilitate intrusion of the diamond blade S into a workpiece during cutting operation, and serve as discharge recesses for discharging swarf and other substances. The recesses 2i incline forward from the outer end thereof with respect to the rotation direction of the steel base plate 1, whereby substantially parallelogram-shaped blade portions each having an outer side longer than the inner side are formed on either side of each of the recesses 2i. Each of the second blade portions 2b has a substantially trapezoidal shape which inclines forward from the outer end thereof with respect to the rotation direction of the base plate, and is formed on a line extending from the corresponding recess 2i of the first blade portion 2a. The third blade portions 2c are formed to serve as extended blade portions, each having a width substantially equal to that of the crest portion of the steel base plate 1 and extending from the diamond-layer joint portion 1d toward the center portion. The first blade portion 2a, the second blade portions 2b, and the third blade portions 2c each have a thickness slightly greater than that of the steel base plate 1. Next, the arrangement of the blade portions 2 on the steel base plate 1 in the present embodiment will be described. In the present embodiment, the third blade portions 2c are formed at four equally spaced locations determined to correspond to the positions of the crest portion 1a of the steel base plate 1, and the second blades 2b are disposed at equal intervals to be located between the third blade portions 2c.

Figure 4:
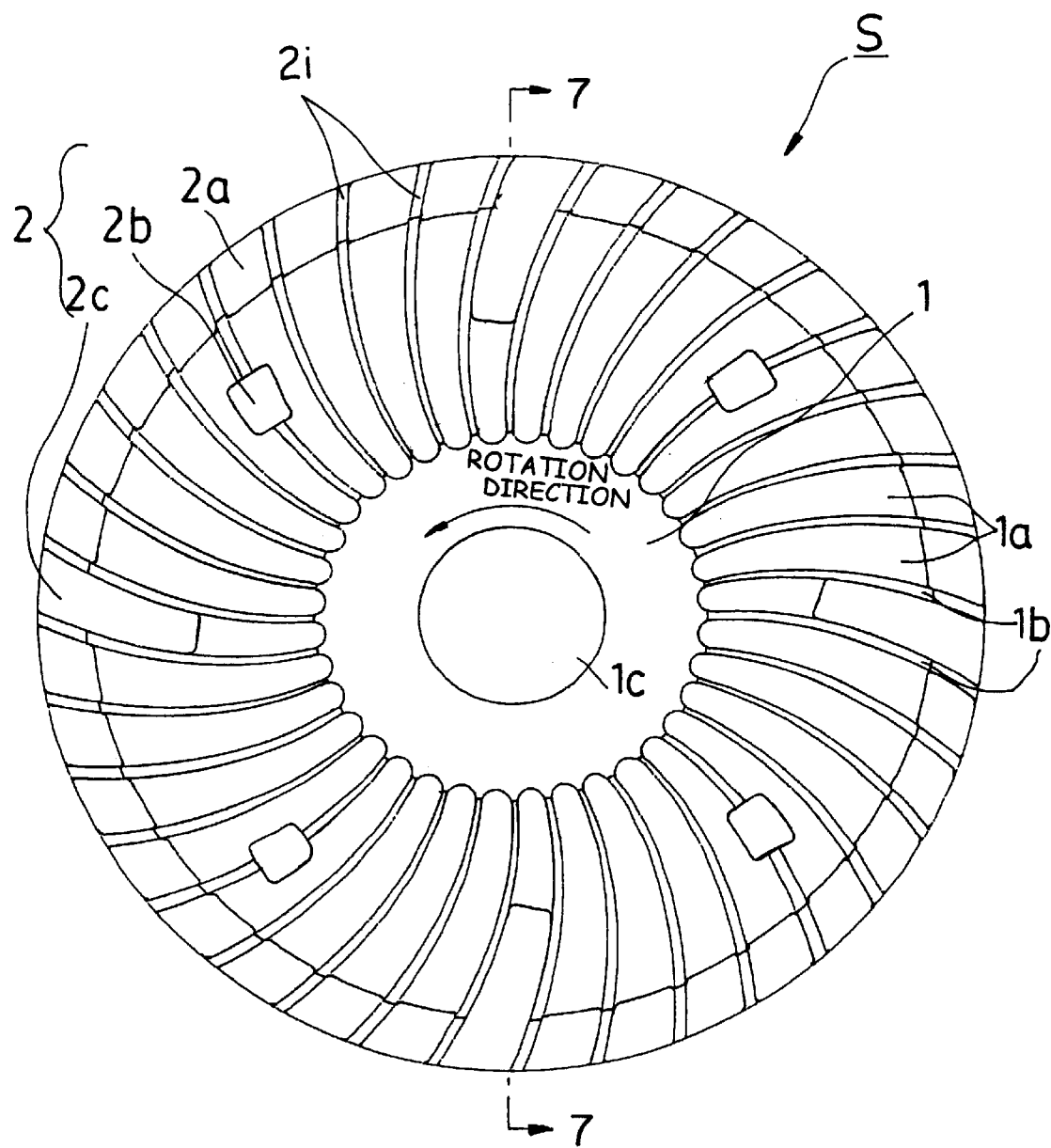
FIG. 4 is a front view of a diamond blade according to a second embodiment of the present invention.
Figure 6:
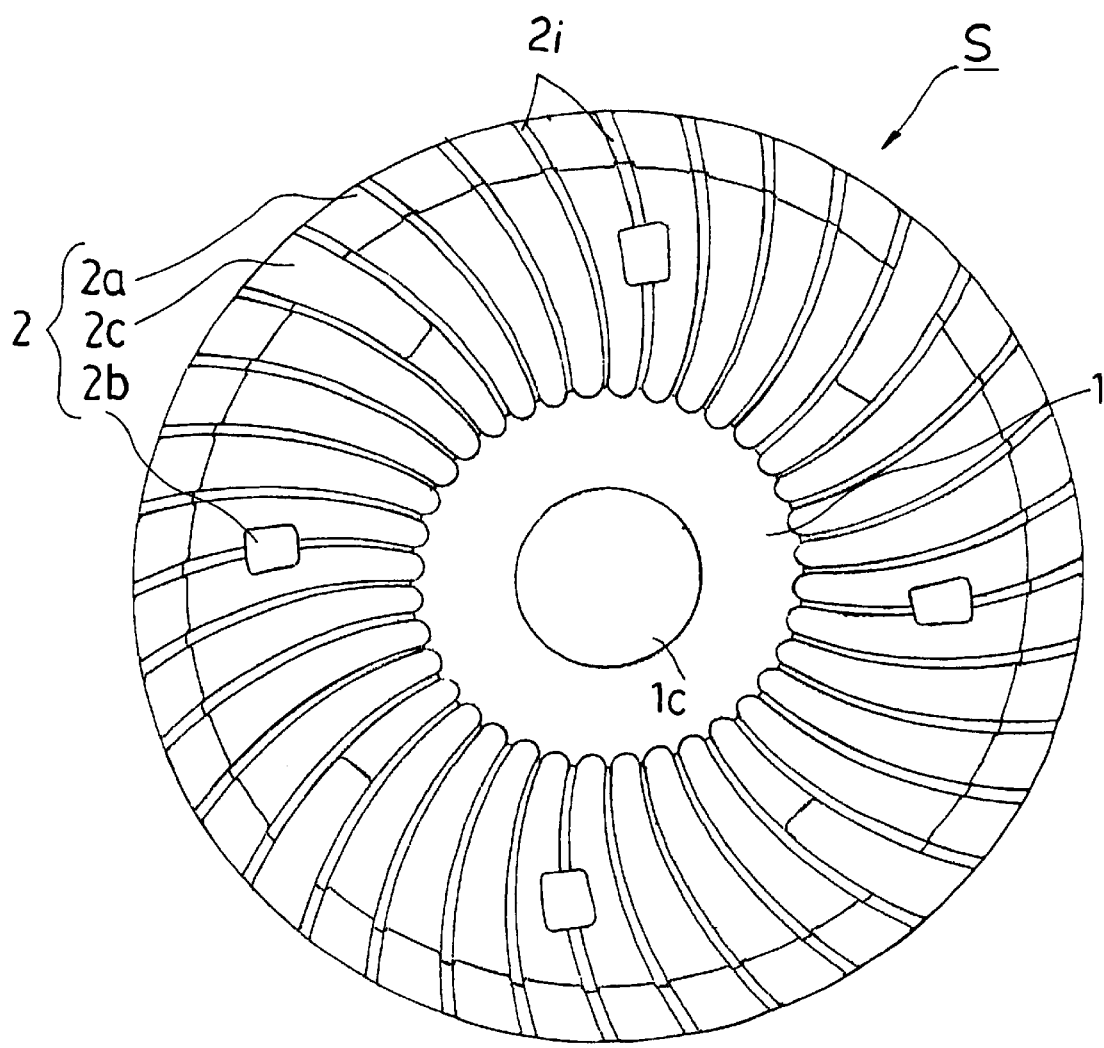
FIG. 6 is a back view of the diamond blade shown in FIG. 4.
Figure 7:
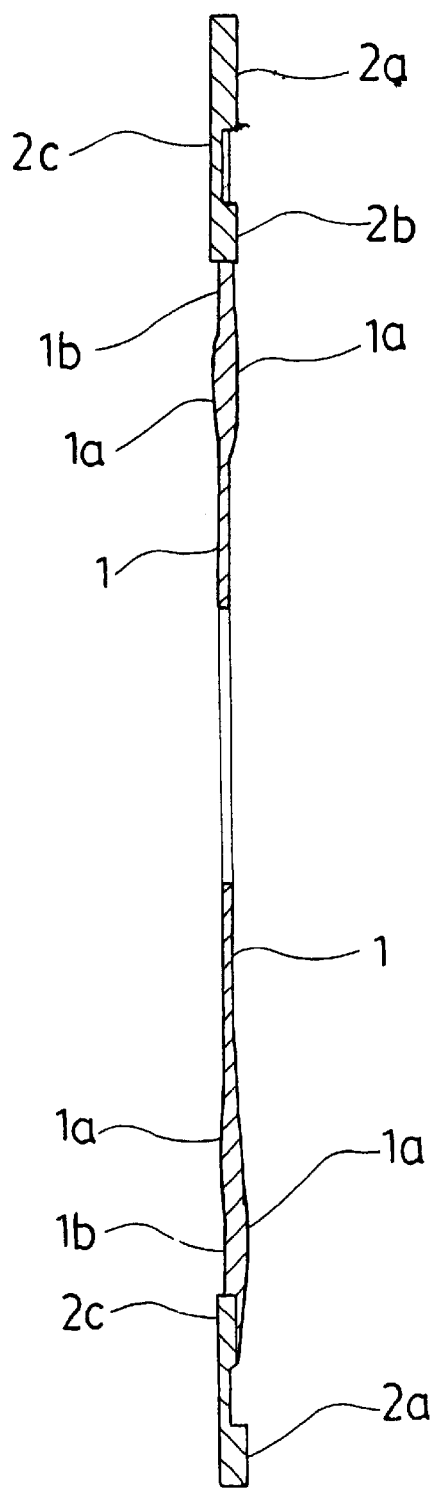
FIG. 7 is a sectional view taken along line A—A of FIG. 4.

Further, as shown in FIG. 4 (front view) and FIG. 6 (rear view), when the second blade portions 2b and the third blade portions 2c are provided on both the front and reverse faces of the steel base plate 1, the second blade portions 2b and the third blade portions 2c are formed on the front and reverse faces of the base plate with a phase difference of a predetermined angle as measured with the rotational center of the steel base plate 1 serving as a vertex. The number of and interval between the second blade portions 2b and the number of and interval between the third blade portions 2c are properly determined in accordance with the size of the diamond blade S and the sizes of the second and third blade portions themselves.

Next, cutting work by use of the diamond blade S according to the second embodiment will be described. First, the first blade portion 2a comes in contact with a workpiece (not shown) and starts cutting. As the amount of intrusion of the diamond blade S into the workpiece increases, the second blade portions 2b located closer to the center of the steel base plate 1, and the third blade portions 2c extending toward the center side come in contact with the workpiece. The cutting work proceeds in this manner.

As described above, the workpiece is cut by the first blade portion 2a, the second blade portions 2b, and the third blade portions 2c having different shapes, and the gaps between the first blade portion 2a and the second blade portions 2b provide spaces immediately after the recesses 2i of the first blade portion 2a in which no blade portion is present. Accordingly, the flow of swarf is divided into a plurality of flows, and thus swarf does not concentrate at the neck, so that neck wear is prevented. Moreover, since the second blade portions 2b and the third blade portions 2c grind the cut surfaces, the finish of the cut surfaces can be improved.

When the diamond blade S of the present invention is used, neck wear can be prevented as described above, and the wavy base plate produces an air-cooling effect upon rotation, so that accumulation of heat at the cutting edge is mitigated effectively. Further, the following effect can be attained.

When the diamond blade S of the present invention is used, the workpiece is cut while the cut surfaces of the workpiece are ground by the second blade portions 2b and the third blade portions 2c. Therefore, there can be prevented generation of friction of steel center, which would otherwise occur due to contact between the cut surface and the base plate, so that lateral deflection during of the diamond blade S cutting operation can be prevented. Thus, straight cutting is enabled. Further, since the size of a clearance provided for suppressing friction of steel center can be reduced, the diamond blade S can be made thinner than can conventional diamond blades.

In the above-described embodiment, an example in which the diamond blade S has the second blade portions 2b is shown. However, the second blade portions 2b may be omitted. Alternatively, there may be employed a structure in which either the second blade portions 2b or the third blade portions 2c are formed on the front or reverse face of the steel base plate 1.

(Third Embodiment)

A diamond blade S according to the present embodiment is manufactured by a so-called direct sintering method in which formation of diamond-abrasive-grain layers is performed simultaneously with bonding of the diamond-abrasive-grain layers to the base plate. The diamond blade S comprises blade portions 2. In the diamond blade S according to the present embodiment, the blade portions 2 include a first blade portion 2a disposed along the outer circumferential edge of the steel base plate 1, second blade portions 2b serving as isolated cutting elements separated from the first blade portion 2a, and fourth blade portions 2d serving as irregularly-shaped blade portions which extend toward the center of the steel base plate 1.

When the diamond blade S is of 4-inch size, the diamond blade S has an outer diameter of 105 mm, a blade thickness of 1.8 mm, and a blade width of 6 mm, and the steel base plate 1 has an outer diameter of 93 mm. These design values are changed in accordance with the size of the diamond blade S. In the following description, the diamond blade S is assumed to be of 4-inch size.

The steel base plate 1 is formed of carbon tool steel and has a circular shape, and an attachment hole 1c for attachment to an unillustrated jig is formed at the center of the steel base plate 1. The steel base plate 1 is preferably manufactured from a special plate; e.g., a three-layer plate well known in the art. In this case, cutting noise generated upon cutting stone or concrete material can be lowered without any change in cutting performance.

Alternatively, in place of the above-described circular flat plate, a circular plate which has crest portions 1a having an arcuate cross section and flat trough (recess) portions 1b which form a wavy surface may be used as the steel base plate 1.

Diamond-layer recesses 2i are formed on the outer circumferential edge of the steel base plate 1. The diamond-layer recesses 2i each have a predetermined width (5 mm in the present embodiment). Blade portions 2a (or 2a and 2d) are disposed on both sides of each diamond-layer recess 2i.

Figures 9A, 9B, 9C:
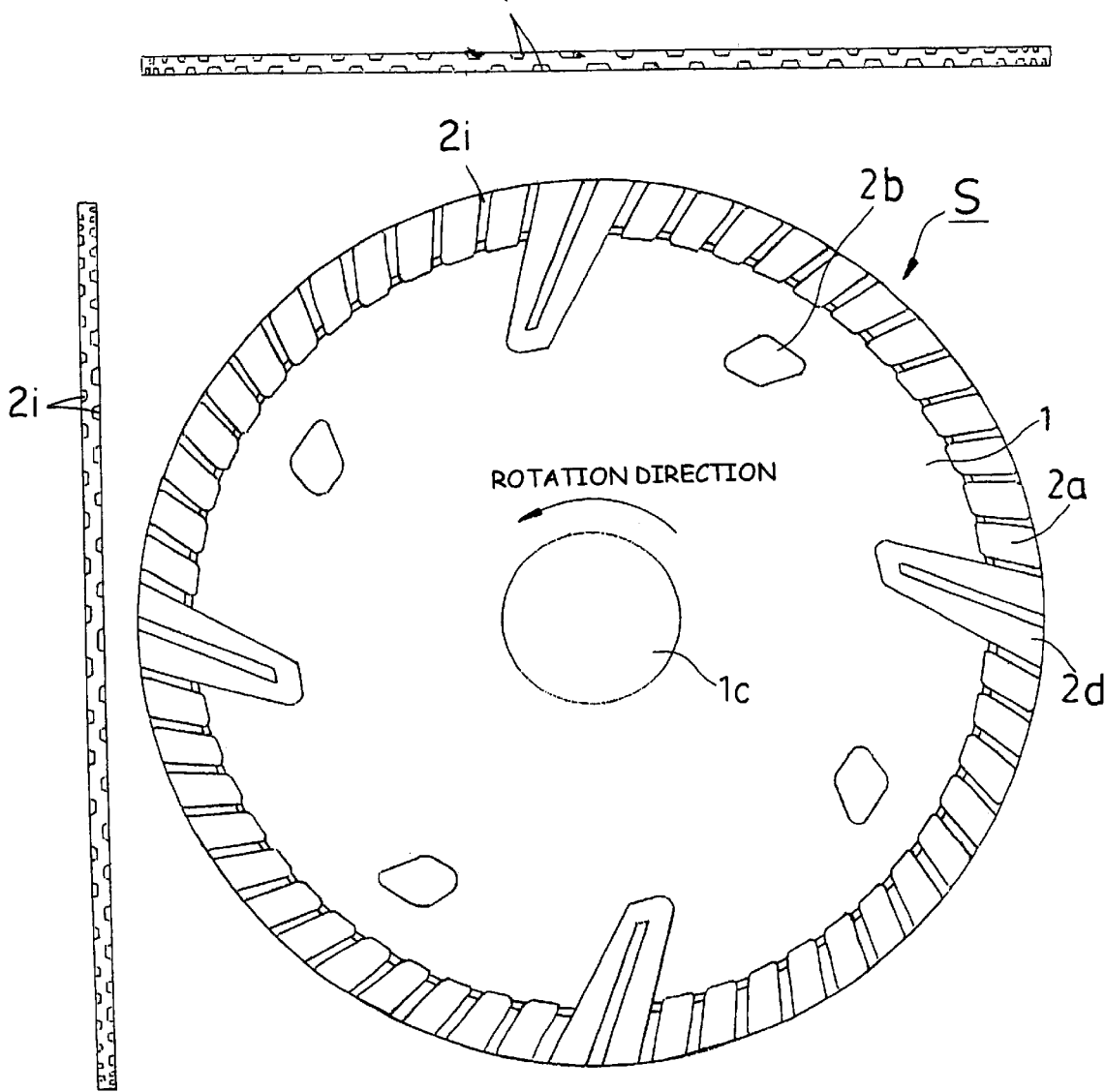
FIG. 9(a) is a front view of the diamond blade according to the third embodiment of the present invention.
FIG. 9(b) is a top view of the diamond blade shown in FIG. 9(a)
FIG. 9(c) is a side view of the diamond blade shown in FIG. 9(a)

As shown in FIGS. 9(b) and 9(c), the first blade portion 2a has recesses 2i which are alternately formed on the front and reverse faces of the steel base plate 1. The recesses 2i facilitates intrusion of the cutting edge into a workpiece during cutting operation, and serve as discharge recesses for discharging swarf and other substances. The recesses 2i incline forward from the outer end thereof with respect to the rotation direction of the steel base plate 1, whereby substantially parallelogram-shaped blade portions each having an outer side longer than the inner side are formed on both sides of each of the recesses 2i. Each of the second blade portions 2b has a substantially trapezoidal shape which inclines forward from the outer end thereof with respect to the rotation direction of the base plate, and is formed on a line extending from the corresponding recess 2i of the first blade portion 2a. The fourth blade portions 2d are formed to serve as irregularly-shaped blade portions of a substantially squarish C-like shape which is formed through extension of the adjacent parallelogram-shaped blade portions via the recess 2i toward the center side and through connection of inner ends of the extended sections. The first blade portion 2a, the second blade portions 2b, and the fourth blade portions 2d each have a thickness slightly greater than that of the steel base plate 1.

Next, the arrangement of the blade portions on the steel base plate in the present embodiment will be described. In the present embodiment, the fourth blade portions 2d are disposed at four equally spaced locations on the steel base plate 1, and the second blades 2b are disposed at equal intervals to be located between the fourth blade portions 2d.

Figure 8:
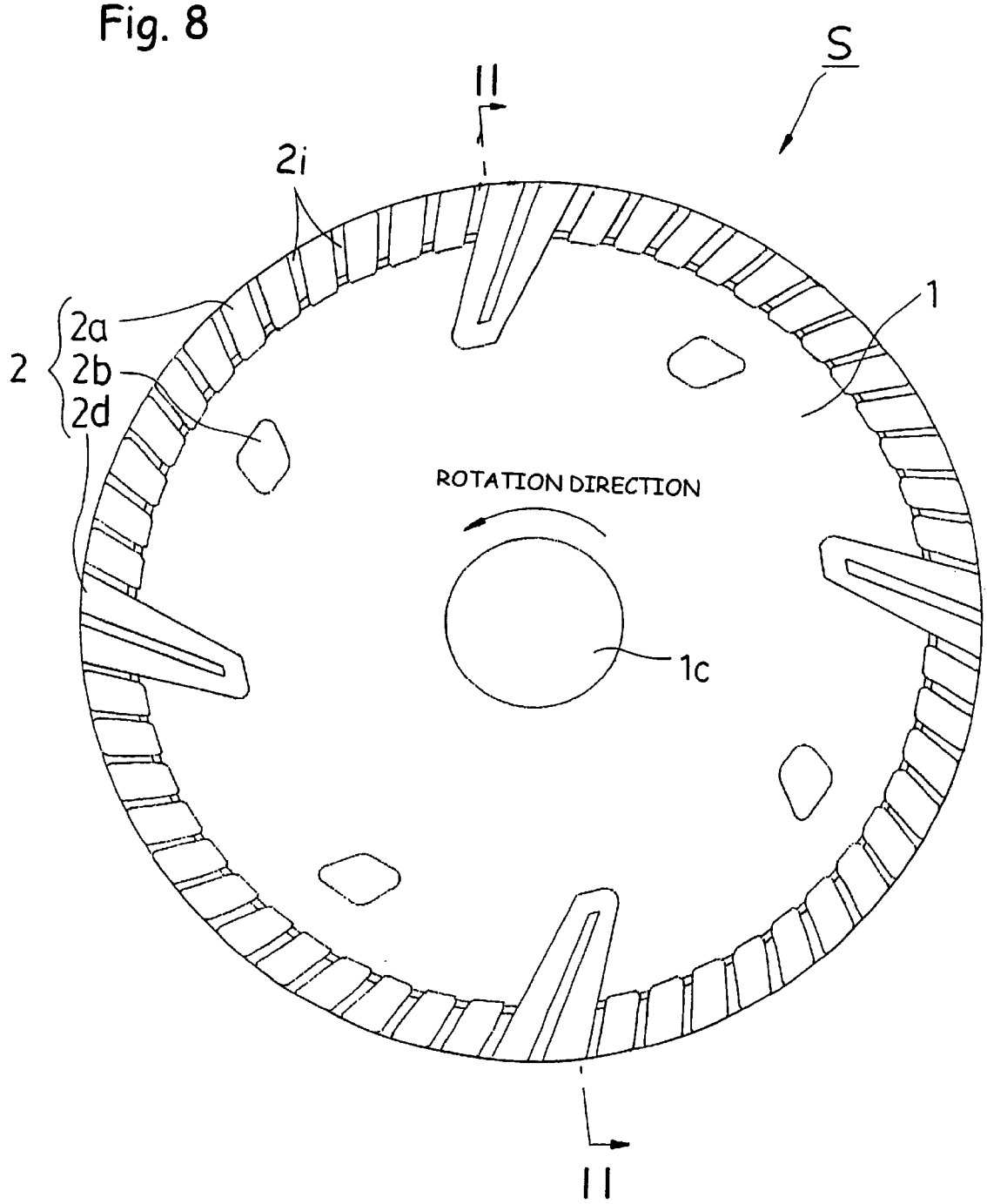
FIG. 8 is a front view of a diamond blade according to a third embodiment of the present invention.
Figure 10:
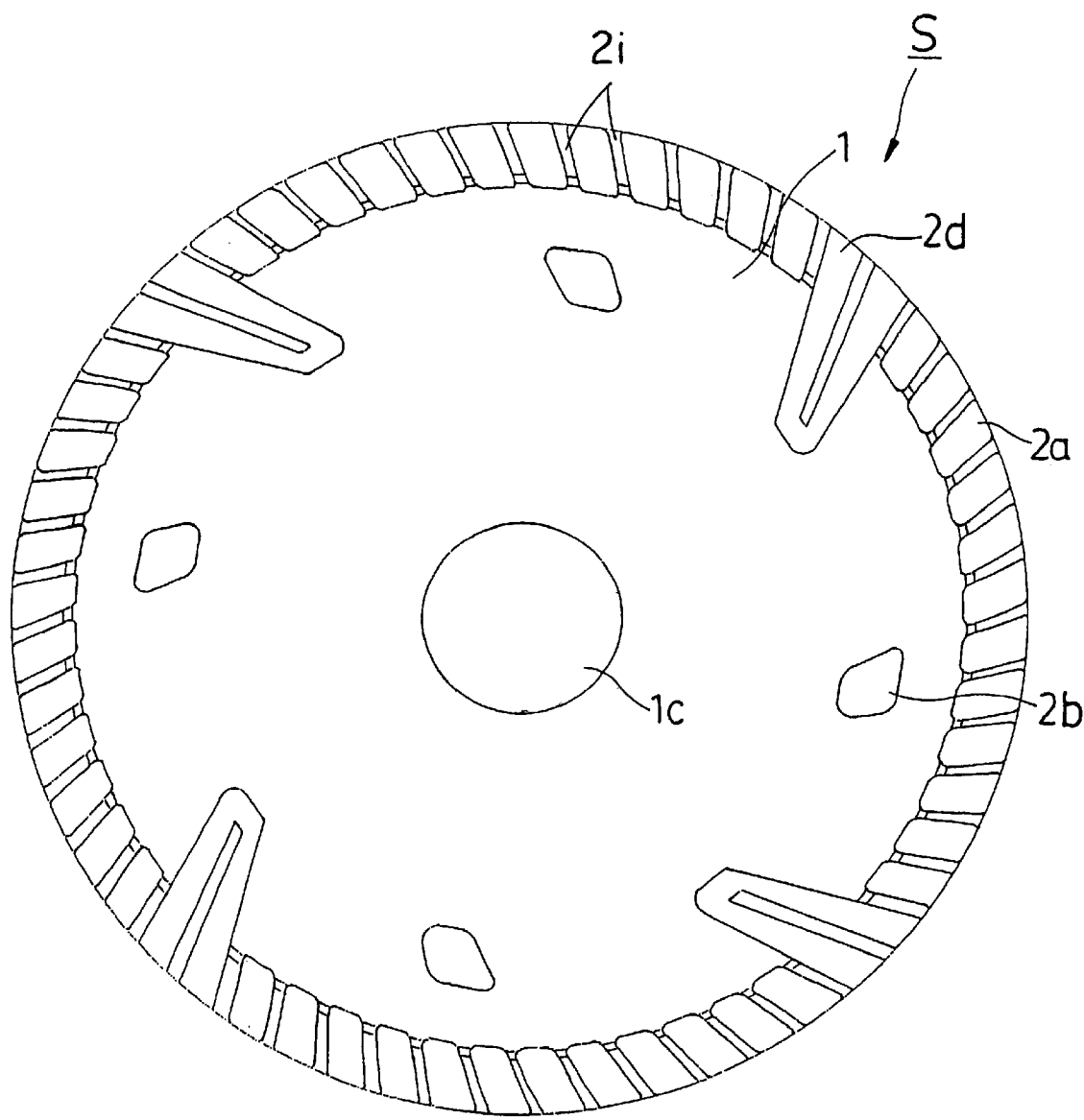
FIG. 10 is a back view of the diamond blade shown in FIG. 8.
Figure 11:
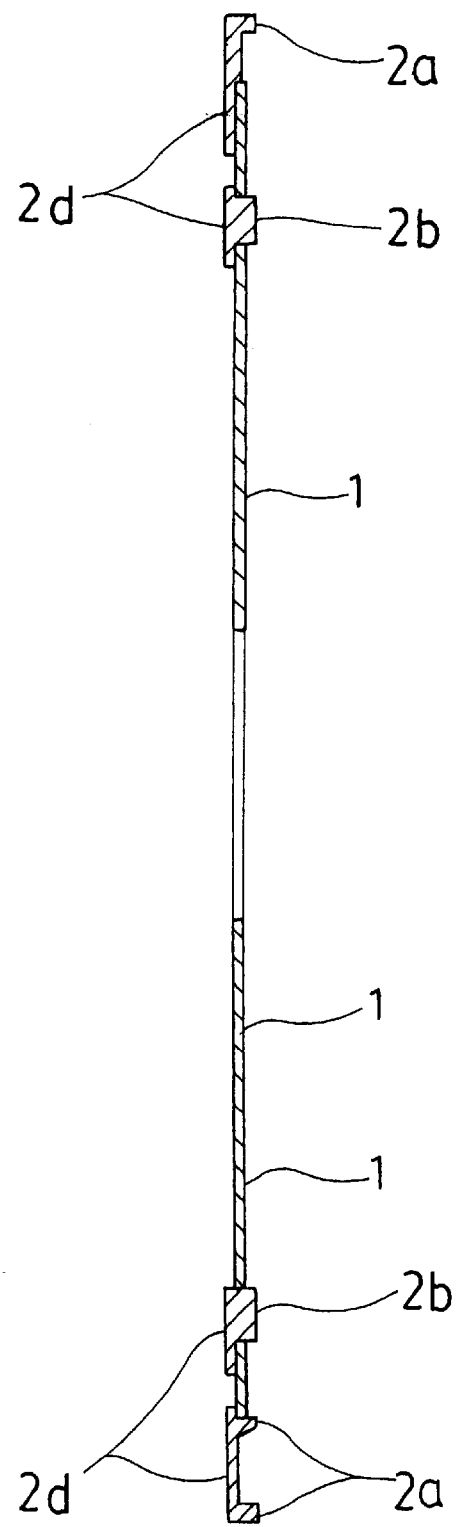
FIG. 11 is a sectional view taken along line B—B of FIG. 8.

Further, as shown in FIG. 8 (front view) and FIG. 10 (rear view), when the second blade portions 2b and the fourth blade portions 2d are provided on both the front and reverse faces of the steel base plate 1, the second blade portions 2b and the fourth blade portions 2d are formed on the front and the reverse faces of the base plate with a phase difference of a predetermined angle as measured with the rotational center of the steel base plate 1 serving as a vertex. The number of and interval between the second blade portions 2b and the number of and interval between the fourth blade portions 2d are properly determined in accordance with the size of the diamond blade S and the sizes of the blade portions 2 themselves.

Next, cutting work by use of the diamond blade S according to the third embodiment will be described. First, the first blade portion 2a comes in contact with a workpiece (not shown) and starts cutting. As the amount of intrusion of the diamond blade S into the workpiece increases, the second blade portions 2b located closer to the center of the steel base plate 1, and the fourth blade portions 2d extending toward the center side come in contact with the workpiece. The cutting work proceeds in this manner.

As described above, the workpiece is cut by the first blade portion 2a, the second blade portions 2b, and the fourth blade portions 2d having different shapes, and the gaps between the first blade portion 2a and the second blade portions 2b provide spaces immediately after the recesses 2i of the first blade portion 2a in which no blade portion is present. Accordingly, the flow of swarf is divided into a plurality of flows, and thus swarf does not concentrate at the neck, so that neck wear is prevented. Moreover, since the second blade portions 2b and the fourth blade portions 2d grind the cut surfaces, the finish of the cut surfaces can be improved.

When the diamond blade S of the present invention is used, neck wear can be prevented as described above, and the following effect can be achieved.

When the diamond blade S of the present invention is used, the workpiece is cut while the cut surfaces of the workpiece are ground by the second blade portions 2b and the fourth blade portions 2d. Therefore, there can be prevented generation of friction of steel center, which would otherwise occur due to contact between the cut surface and the base plate, so that lateral deflection of the diamond blade during cutting operation can be prevented. Thus, straight cutting is enabled. Further, since the size of a clearance provided for suppressing friction of steel center can be reduced, the diamond blade S can be made thinner than can conventional diamond blades.

Further, since each of the fourth blade portions 2d has a generally squarish C-like shape and has a recess at the center portion, during cutting of the workpiece, swarf enters the center recess and is discharged as the diamond blade rotates, and thus the amount of swarf stagnating at the neck can be reduced. In this manner, neck wear is prevented more reliably. In addition, the recesses reduce the resistance generated on the side faces during cutting, so that the diamond blade S has improved cutting efficiency.

In the above-described embodiment, an example in which the diamond blade S has the second blade portions 2b is shown. However, the second blade portions 2b may be omitted. Alternatively, there may be employed a structure in which either the second blade portions 2b or the fourth blade portions 2d are formed on the front or reverse face of the steel base plate 1.

(Fourth Embodiment)

Figure 12:
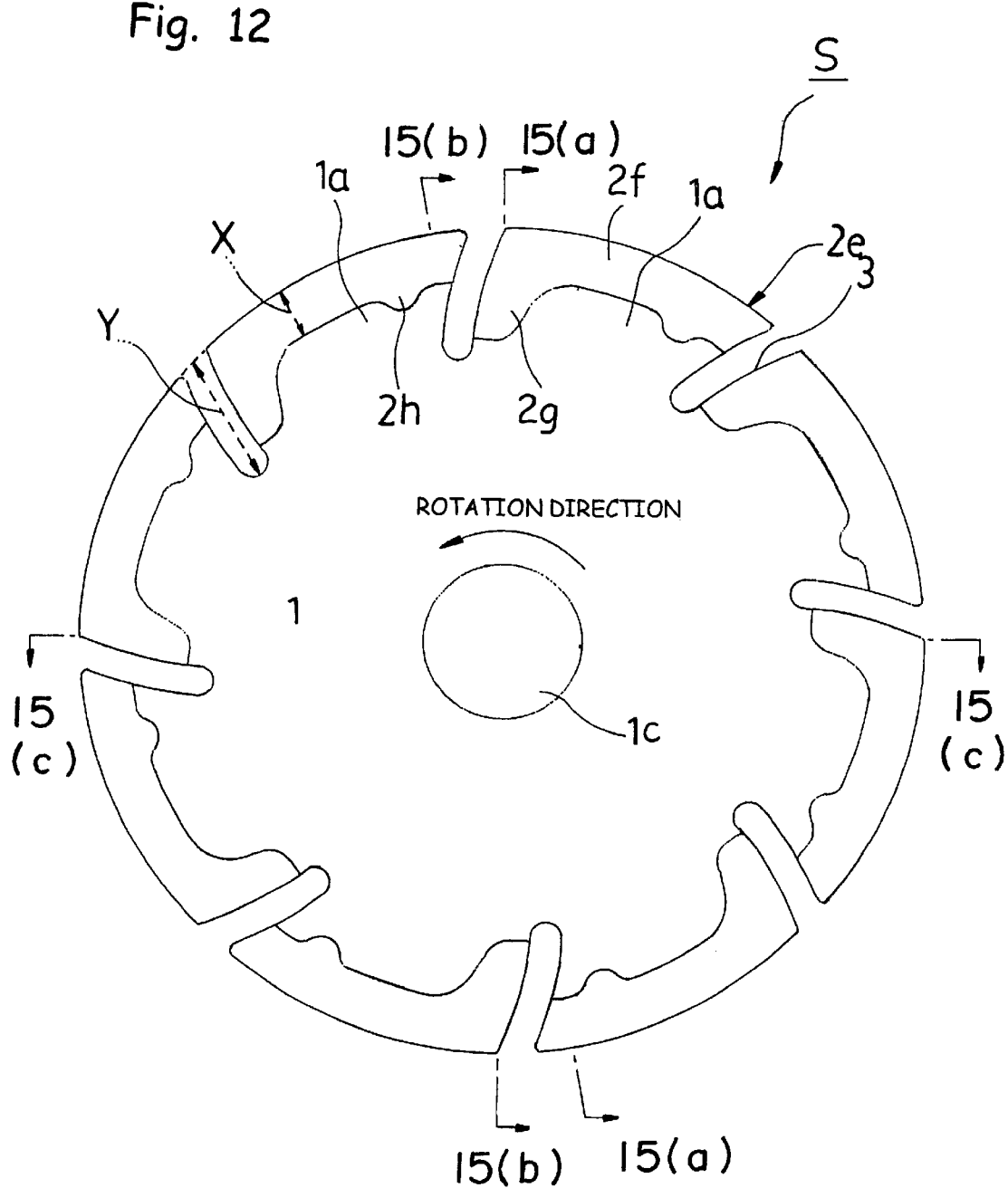
FIG. 12 is a front view of a diamond blade according to a fourth embodiment of the present invention.
Figure 14:
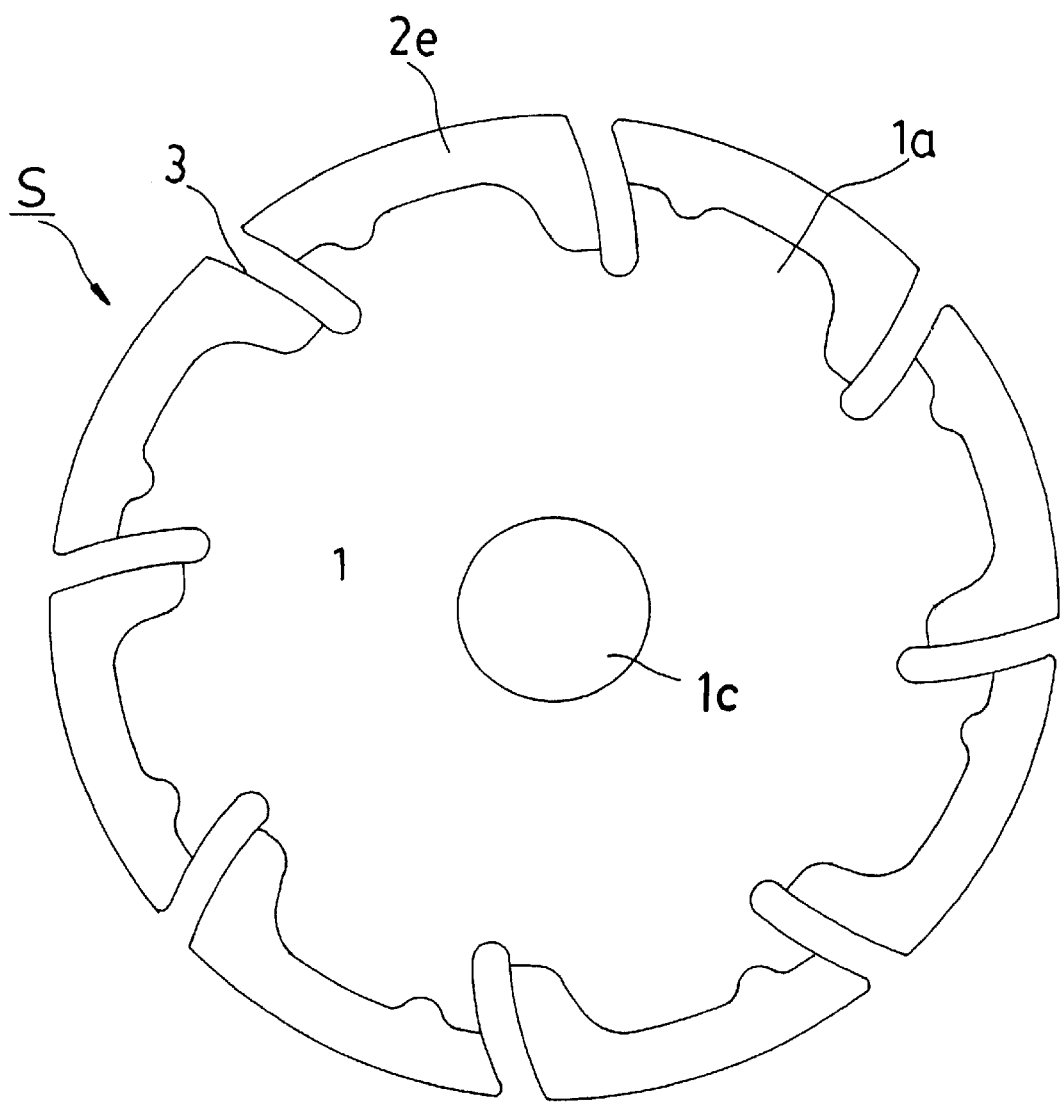
FIG. 14 is a back view of the diamond blade shown in FIG. 12.
Figure 15A:
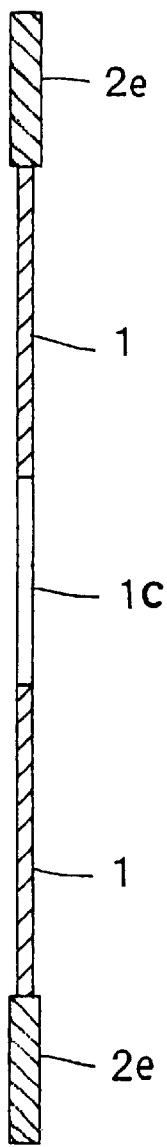
FIG. 15(a) is a sectional view taken along line C—C of FIG. 12.
Figure 15B:
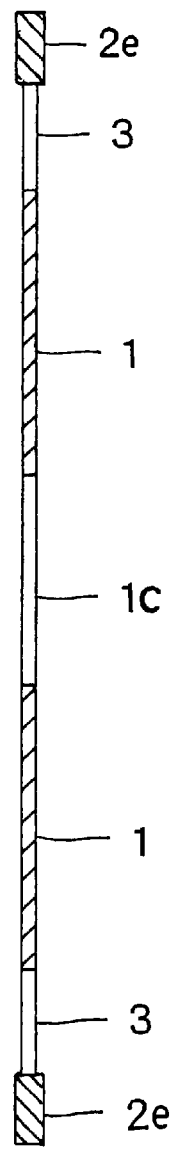
FIG. 15(b) is a sectional view taken along line D—D of FIG. 12.
Figure 15C:
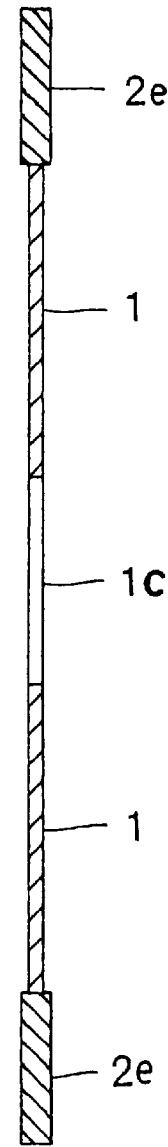
FIG. 15(c) is a sectional view taken along line E—E of FIG. 12.

As shown in FIG. 12, a diamond blade S according to the present embodiment comprises a steel base plate 1 and a plurality of diamond segments 2e. The diamond blade S is manufactured through direct sintering in which the diamond segments 2e, which are structural elements, are bonded to the steel base plate 1.

When the diamond blade S is of 4-inch size, the diamond blade S has an outer diameter of 105 mm and eight diamond segments each having a thickness of 1.8 mm and a width of 6 mm; and the steel base plate 1 has an outer diameter of 93 mm and a thickness of 1.4 mm. These design values are changed in accordance with the size of the diamond blade S. In the following description, the diamond blade S is assumed to be of 4-inch size.

The steel base plate 1 is formed of carbon tool steel and has a circular shape, and an attachment hole 1c for attachment to an unillustrated jig is formed at the center of the steel base plate 1. The steel base plate 1 is preferably manufactured from a special plate; e.g., a three-layer plate well known in the art. In this case, cutting noise generated upon cutting stone or concrete material can be lowered without any change in cutting performance.

A plurality of slots 3 are provided in the outer circumferential portion of the steel base plate 1 at constant intervals. The slots 3 are formed to incline toward the rotation direction of the diamond blade S. Diamond segment attachment portions 1a are formed between adjacent slots 3, and the plurality of diamond segments 2e are disposed at the diamond segment attachment portions 1a. In the present embodiment, eight slots 3 are provided, and the diamond segment attachment portion 1a is formed at eight locations between the slots 3.

The steel base plate 1 is not limited to the above-described circular plate, and may be a circular plate which has crest portions having an arcuate cross section and flat trough (recess) portions which form a wavy surface, or a circular plate which has alternately formed crest portions and flat trough (recess) portions which extend radially from the center. As to the slots 3, there is shown one having a U-like shape. However, the slots 3 may have a key-like shape in which the center side end is cut into a circular shape. Further, the number of the slots 3 is not limited to 8, and may be changed in accordance with the outer diameter of the diamond blade S.

Each of the diamond segments 2e has an extension portion 2g which extends along the slot 3 located on the side of the front end portion of the diamond segment 2e with respect to the rotation direction of the diamond blade 5, and an elongated portion 2f which extends along the outer circumferential surface of the diamond segment attachment portion 1a to thereby form an L-like shape. Since the diamond segment 2e of the present embodiment is rounded at the bent portion of the L shape, stagnation of swarf at the bent portion is prevented.

The extension portion 2g extends up to a point in the vicinity of the bottom of the corresponding slot 3. The length of the extension portion 2g is not limited to the length shown in FIG. 12 and may be set freely insofar as the length is greater than the width of the elongated portion 2f.

Further, each of the diamond segments 2e has a semicircular projection 2h which is formed in the vicinity of the rear end of the diamond segments 2e with respect to the rotation direction and which extends toward the attachment hole ic. Formation of the projection 2h enables the diamond segment 2e to be fixed more reliably to the diamond segment attachment portion 1a of the steel base plate 1.

In the present embodiment, each of the diamond segments 2e is formed into a generally L-like shape whose bent portion is rounded; however, the shape of the diamond segments 2e is not limited thereto. The diamond segments 2e may be formed into a generally L-like shape which has a sharp bent portion which is not rounded. Further, the shape of the projections 2h is not limited to semi-circular, and may be rectangular or triangular. Alternatively, there may be employed a structure in which the projections 2h are omitted.

The diamond blade S of the present invention is manufactured by a so-called direct sintering method in which the steel base plate 1 having been machined into a predetermined shape in advance and a powder mixture of diamond abrasive grains and adhesive having a predetermined composition are placed in a mold; and sintering of the diamond segments 2e and bonding of the diamond segments 2e to the steel base plate 1 are performed simultaneously in a hot press sintering furnace. Needless to say, the diamond segments 2e may be attached to the steel base plate 1 through brazing.

Next, cutting work by use of the diamond blade S according to the present embodiment having the above-described structure will be described. First, the elongated portions 2f of the diamond segments 2e come in contact with a workpiece (not shown) and start cutting. As the amount of intrusion of the diamond blade S into the workpiece increases, the extension portions 2g extending along the slots 3 come in contact with the workpiece. The cutting work proceeds in this manner.

As described above, the workpiece is cut while its cut surfaces are ground by the extension portions 2g. Further, swarf is discharged from the slots 3. Therefore, it is possible to prevent swarf from entering spaces located on the radially inner side of the joint portion between the steel base plate 1 and the diamond segments 2e, to thereby prevent neck wear which would otherwise occur upon swarf scraping the portion of the steel base plate 1 located on the radially inner side of the joint portion. Moreover, the finish of the cut surfaces can be improved.

In order to confirm the above-described neck-wear prevention effect, the following experiment was performed. There were prepared a power tool to which the diamond blade S of the present invention was attached such that the diamond blade S could rotate in the forward direction, and a power tool to which the diamond blade S of the present invention was attached such that the diamond blade S could rotate in the reverse direction. A mortar member and a grinding wheel were cut by use each of the above-described tools, and the amount of neck wear was measured.

Specifically, in the experiment, PDA-100D·12000 rpm (Product of Hitachi Koki) was used as the power tool. As workpieces, a mortar material and a grinding wheel (hardness: P) were used. In the case of the mortar material, cutting over a length of 30 cm was repeated 100 times (total cut length: 30 m). In the case of the grinding wheel, cutting over a length of 6 cm was repeated 130 times (total cut length: 7.8 m).

The items evaluated in the neck wear measurement experiment were amount (ΔT) of wear of the diamond segments in the thickness direction, and the amount (Δt) of wear of the steel base plate in the thickness direction. The table of FIG. 17 shows the results of the experiment.

The results of the experiment show that when a workpiece which causes great wear of the diamond blade is cut, depending on the angle of inclination of the extension portions 2g (the angle of inclination of the slots 3), neck wear can be suppressed to about 60% through employment of the arrangement in which the extension portions 2g of the diamond segments 2e are located on the front side with respect to the rotation direction of the diamond blade S, as compared with the arrangement in which the extension portions 2g of the diamond segments 2e are not located on the front side with respect to the rotation direction of the diamond blade S.

Use of the diamond blade of the present invention prevents neck wear as described above, and achieves the following effect.

That is, when the diamond blade S of the present invention is used, the workpiece is cut while the cut surfaces of the workpiece are ground by the extension portions 2g. Therefore, there can be prevented generation of friction of steel center, which would otherwise occur due to contact between the cut surface and the base plate, so that lateral deflection of the diamond blade S during cutting operation can be prevented. Further, since the size of a clearance provided for suppressing friction of steel center can be reduced, the diamond blade S can be made thinner than can conventional diamond blades.

Further, since the extension portions 2g are disposed along the slots 3, swarf generated during cutting work is discharged via the slots 3. Therefore, there can be prevented rotational friction which is produced due to stagnation of swarf between the cut surfaces and the steel base plate 1.

Moreover, since the slots 3 are formed to incline toward the rotation direction, during cutting operation, the diamond segments 2e can intrude into a workpiece more easily, and the stability of the diamond blade S is maintained, so that the performance of the blade in traveling straight can be improved.

Furthermore, since the diamond blade S of the present invention is manufactured by the method in which sintering of the diamond segments 2e is performed simultaneously with bonding of the diamond segments 2e to the steel base plate 1, the diamond blade S can be manufactured at low cost.

Figure 16:
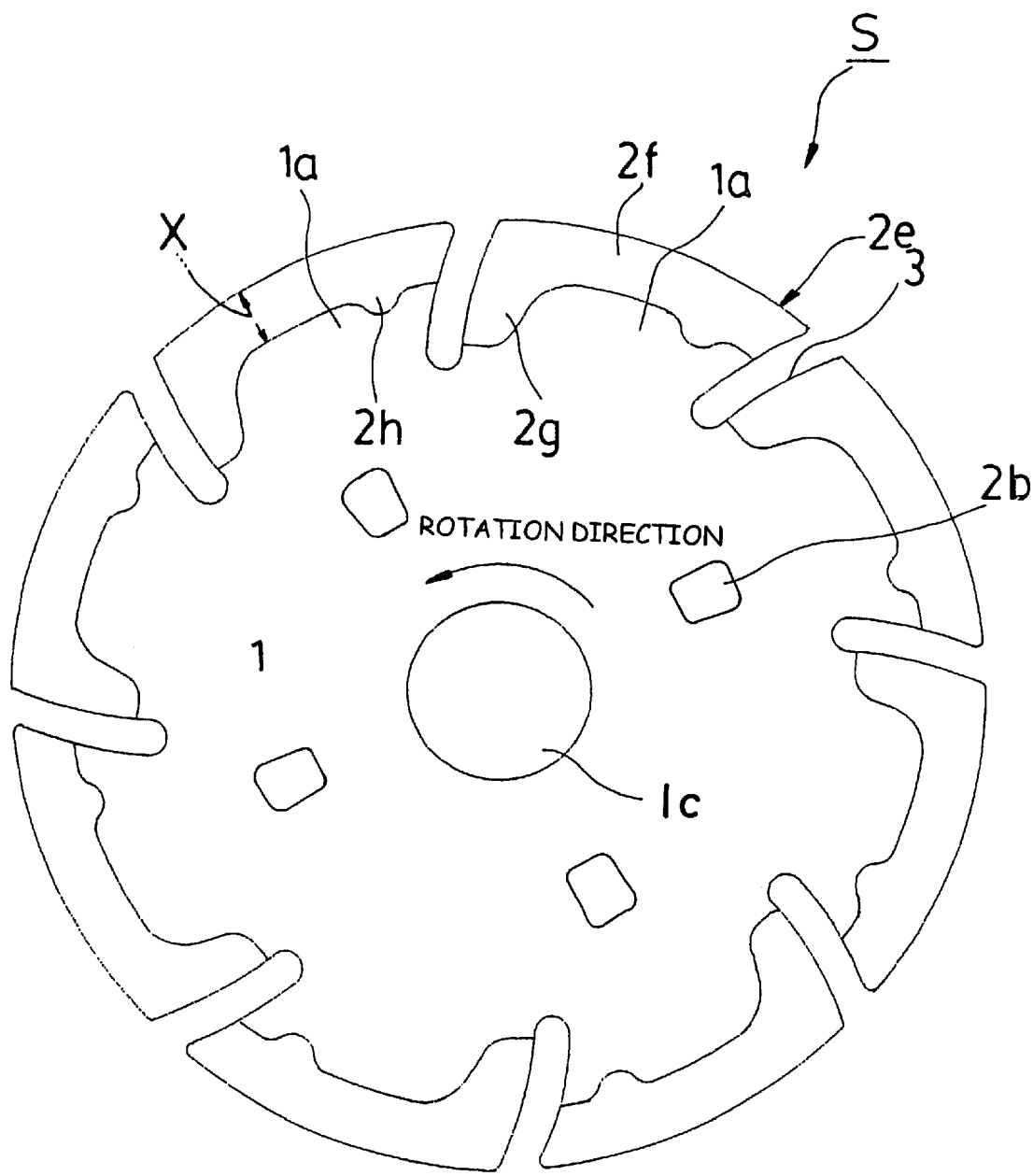
FIG. 16 is an explanatory view showing a state in which isolated cutting elements are provided on the diamond blade of FIG. 12.
Figure 18:
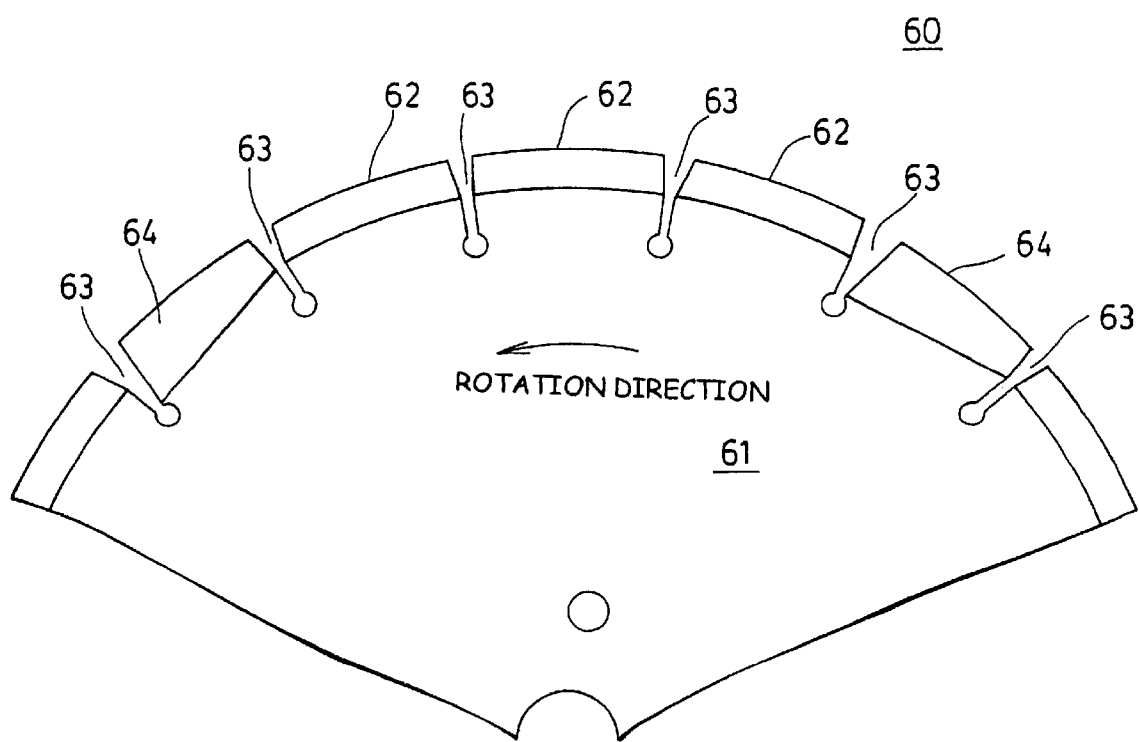
FIGS. 18 and 19 are explanatory views showing conventional diamond blades.
Figure 19:
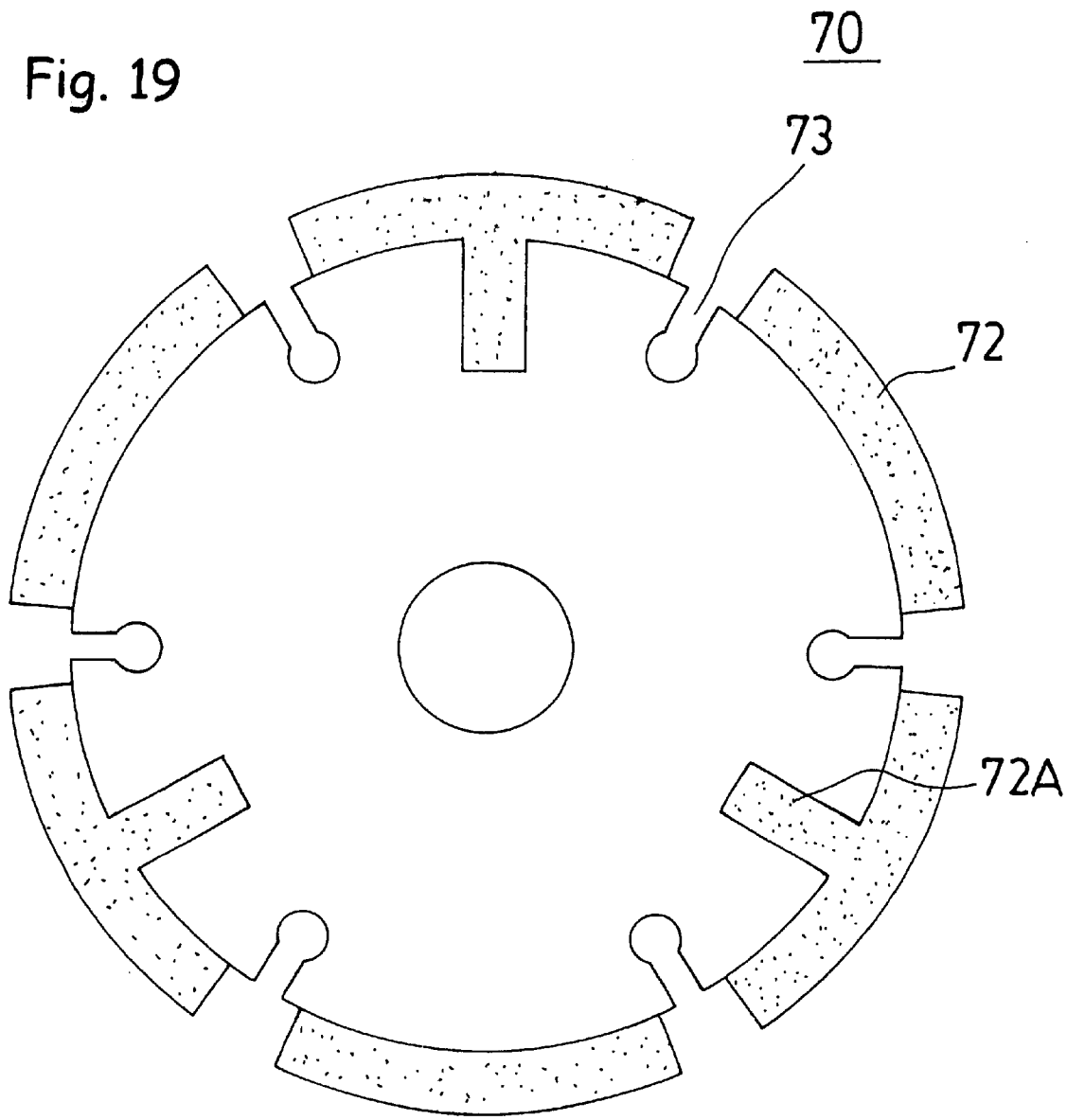

As shown in FIG. 16, the second blade portions 2b serving as isolated cutting elements may be provided at predetermined positions separated from the diamond segments 2e. When, as described above, the isolated cutting elements are provided at predetermined positions of the steel base plate 1, the flow of swarf is divided into a plurality of flows due to the presence of gaps between the diamond segments 2e and the second blade portions 2b. Accordingly, swarf does not concentrate at the neck, so that neck wear is prevented.

Moreover, since the second blade portions 2b grind the cut surfaces, the finish of the cut surfaces can be improved.

In addition, when the diamond blade S of the present invention is used, the workpiece is cut while the cut surfaces of the workpiece are ground by the second blade portions 2b. Therefore, there can be prevented generation of friction of steel center, which would otherwise occur due to contact between the cut surface and the base plate, so that lateral deflection during cutting operation can be prevented. Thus, straight cutting is enabled. Further, since the size of a clearance provided for suppressing friction of steel center can be reduced, the diamond blade S can be made thinner than can conventional diamond blades.

INDUSTRIAL APPLICABILITY

As described above, the present invention reduces neck wear of a diamond blade to thereby improve the durability of the diamond blade, which is greatly advantageous in terms of cost. Further, since the diamond blade cuts a workpiece while its isolated cutting elements or blade portions extending toward the center grind cut surfaces of the workpiece, cut surfaces of excellent finish are obtained.

In addition, since formation of diamond-abrasive-grain layers, each of which has a complicated shape and serves as a blade portion, and bonding of the diamond-abrasive-grain layers to the base plate are performed through direct sintering, a diamond blade having excellent performance can be provided at low cost.

Further, since slots are formed in the steel base plate, and extension portions of diamond segments extend along the slots, rotational friction stemming from friction of steel center and stagnation of swarf is prevented, and surfaces of excellent finish can be obtained.

We claim:

1. A diamond blade comprising a base plate having an outer circumferential edge, a blade portion formed of diamond abrasive grains fixed to said base plate along said outer circumferential edge, and cutting elements extending through said base plate and exposed at both of opposing faces of said base plate, said cutting elements being radially inward of and separated from said blade portion at least at one surface of said base plate.

2. A diamond blade according to claim 1, wherein said blade portion is formed of diamond abrasive grains and is fixed to said outer circumferential edge of said base plate by means of direct sintering, and recesses are formed alternately on the opposing faces of said base plate, each of said recesses extending inward from outer circumferential edge of the base plate and inclining radially outward opposite the rotation direction of the base plate.

3. A diamond blade according to claim 2, wherein said cutting elements are respectively formed on lines extending from the corresponding recesses.

4. A diamond blade according to claim 2, wherein said blade portion is in sections, each of said blade sections being formed of diamond abrasive grains and located between a pair of adjacent recesses, a first group of said blade sections extending toward the center of the base plate further than a second group of said blade sections and spaced at predetermined intervals between blade sections of said second group.

5. A diamond blade according to claim 4, said first group of blade sections are formed on both the front and the reverse faces of the base plate.

6. A diamond blade according to claim 5, wherein said blade sections of said first group are formed on the front and reverse faces of the base plate with a phase difference of a predetermined angle as measured with the rotational center of the base plate being regarded as a reference point.

7. A diamond blade according to claim 2, wherein said blade portion is in blade sections formed of diamond abrasive grains, wherein said blade sections include paired blade sections, each pair sandwiching one of said recesses on the front or reverse face of the base plate, said paired blade sections extending further toward the center of the base plate than other blade sections, with inner ends of the paired blade sections connected together to form a substantially squarish C-shape.

8. A diamond blade according to claim 7, wherein said paired blade sections are formed on the front and reverse faces of the base plate with a phase difference of a predetermined angle as measured with the rotational center of the base plate being regarded as a reference point.

9. A diamond blade according to claim 1, wherein said cutting elements are fixed to predetermined positions of the base plate by means of direct sintering.

10. A diamond blade according to claim 1, wherein each of said cutting elements has a substantially trapezoidal shape which inclines forward from an outer end thereof, with respect to the rotation direction of the base plate.

11. A diamond blade according to claim 1, wherein crest portions and trough portions are alternately formed on opposite faces of the base plate, so that the base plate has opposing faces with wavy surfaces.

* * * * *